United States Patent

Peters et al.

[11] Patent Number: 5,298,909
[45] Date of Patent: Mar. 29, 1994

[54] COAXIAL MULTIPLE-MODE ANTENNA SYSTEM

[75] Inventors: Steven J. Peters; David C. Vacanti, both of Renton, Wash.

[73] Assignee: The Boeing Company, Seattle, Wash.

[21] Appl. No.: 804,720

[22] Filed: Dec. 11, 1991

[51] Int. Cl.⁵ ................. H01Q 21/280; G01S 13/870
[52] U.S. Cl. .................... 343/720; 342/53; 343/725
[58] Field of Search ............. 343/720, 725, 781 CA; 342/53

[56] References Cited

U.S. PATENT DOCUMENTS

| | | | |
|---|---|---|---|
| 2,895,127 | 7/1959 | Padgett | 342/53 |
| 2,972,743 | 2/1961 | Svensson et al. | 343/838 |
| 3,114,149 | 12/1963 | Jessen, Jr. | 343/720 |
| 3,165,749 | 1/1965 | Cushner | 343/911 R |
| 3,763,493 | 10/1973 | Shimada et al. | 343/911 R |
| 4,151,968 | 5/1979 | Lamelot | 250/338 |
| 4,282,527 | 8/1981 | Winderman et al. | 343/725 |
| 4,477,814 | 10/1984 | Brumbaugh et al. | 343/725 |
| 4,636,797 | 1/1987 | Saffold et al. | 343/725 |
| 4,652,885 | 3/1987 | Saffold et al. | 343/725 |
| 5,041,840 | 8/1991 | Cipolla et al. | 343/725 |
| 5,089,828 | 2/1992 | Moss | 343/725 |

FOREIGN PATENT DOCUMENTS 0178682 8/1986 Japan ............................. 342/53
0000879 1/1987 Japan ............................. 342/53

*Primary Examiner*—Rolf Hille
*Assistant Examiner*—Peter Toby Brown
*Attorney, Agent, or Firm*—Christensen, O'Connor, Johnson & Kindness

[57] ABSTRACT

A coaxial multiple-mode antenna system (10) is disclosed, including a coaxial input section (14) for coaxially collecting, for example, MMW and IR electromagnetic radiation. The IR radiation is focused to a point at the input section's focal plane, while the MMW beam has a relatively large width in this plane. An interface section (16) includes an IR section (18) and MMW section (20) that allow the two beams to be separately processed with a minimum of losses. In that regard, the MMW section includes a lens (42), having an incident surface, the center of which is positioned at the focal plane. An optical fiber (46) extends axially through the lens and has an incident end that is aligned with the incident surface of the lens. The lens quasi-optically transmits the MMW beam to a detection circuit (26), while the optical fiber transmits the IR beam to detection circuit (22). Because the optical fiber receives the IR beam before it is processed by the lens, IR losses are limited. Further, the small diameter of the optical fiber and its axial alignment in the lens cause minimal disruption of the MMW beam.

22 Claims, 5 Drawing Sheets

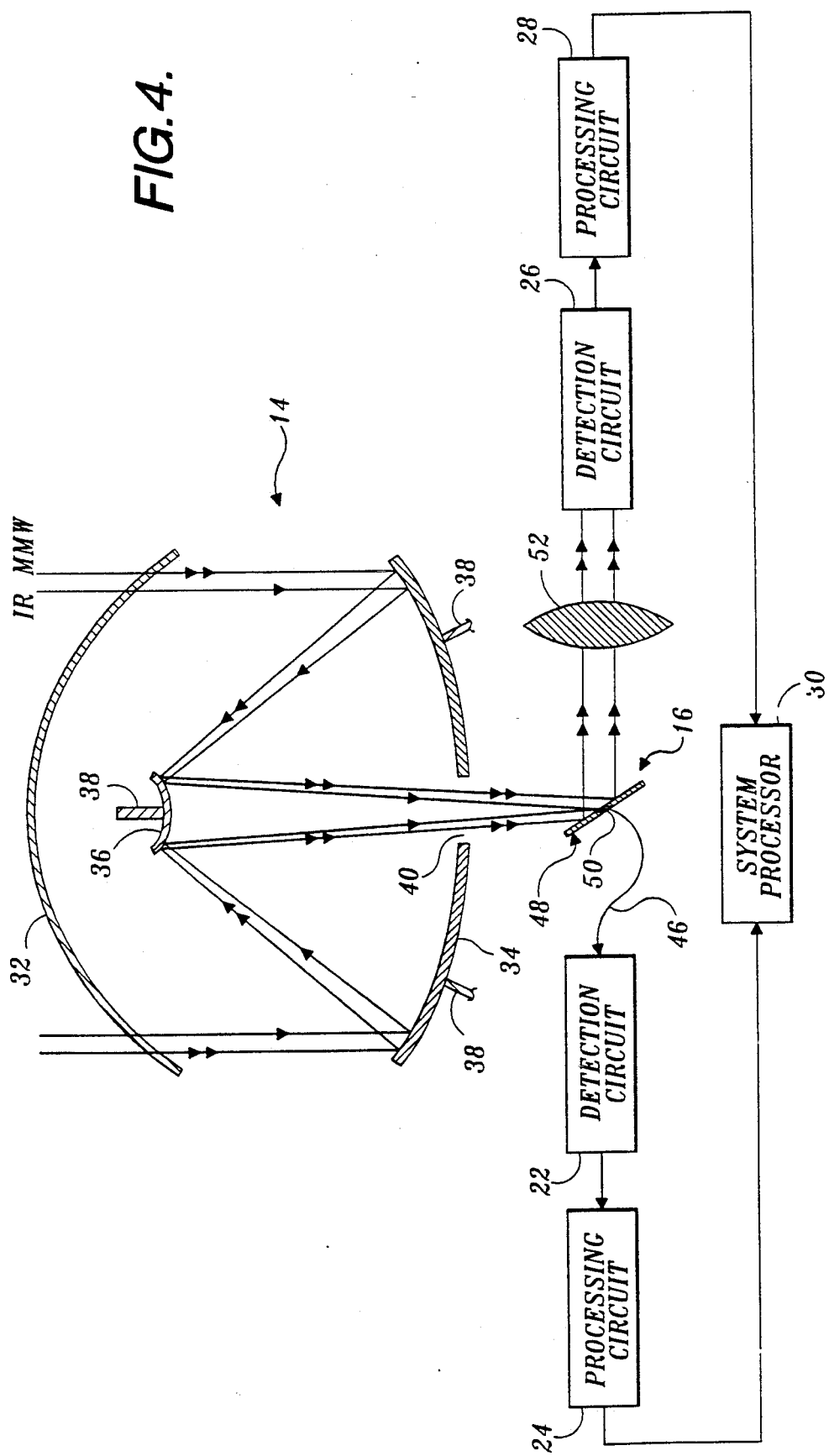

COAXIAL MULTIPLE-MODE ANTENNA SYSTEM

FIELD OF THE INVENTION

This invention relates generally to antenna systems and, more particularly, to such systems for transmitting and receiving electromagnetic radiation over multiple frequency ranges.

BACKGROUND OF THE INVENTION

A variety of antenna systems have been developed for use in receiving and transmitting electromagnetic energy. In that regard, most antenna systems are designed for use with a single portion of the electromagnetic spectrum, falling somewhere between the low-frequency audio end of the spectrum and the high-frequency ultraviolet end of the spectrum.

Some antenna systems have, however, been developed for use with more than one portion of the electromagnetic spectrum. Multiple-mode antenna systems are used, for example, in military and industrial detection systems to receive radiation from moving and stationary objects within the antenna system's field of view, allowing the objects to be accurately detected, analyzed, and tracked by the detection system. In such systems, any shortcomings attributable to operation of the detection system over one portion of the electromagnetic spectrum may be compensated for by operation of the system over the other portion of the spectrum.

Of particular interest are dual-mode antenna systems operable, for example, in the radio frequency (RF) and electro-optical (EO) portions of the electromagnetic spectrum. The RF spectrum includes millimeter wave (MMW), super high frequency (SHF), and ultrahigh frequency (UHF) radiation. Systems operating in this frequency range can detect objects over long distances and wide areas, with relatively little interference from environmental elements such as rain, fog, atmospheric particulate, and haze. Due to the wide beamwidth employed, however, RF systems typically exhibit relatively low angular resolution.

The EO spectrum is much higher in frequency than the RF spectrum and includes ultraviolet (UV), visible, and infrared (IR) radiation. Because EO systems employ relatively narrow beamwidths, they are able to resolve objects with high angular resolution. Unfortunately, the range of EO systems is limited in adverse conditions.

A detection system including a dual-mode antenna system for receiving both MMW and IR radiation advantageously allows objects to be selectively detected over long ranges, with a high degree of accuracy and a limited amount of interference from environmental elements. In a dual-mode system, detectors responsive to the received MMW and IR radiation produce detection outputs that are correlated and alternatively relied upon to provide the desired performance characteristics.

The development of a suitable dual-mode MMW/IR antenna system has not, however, been easily achieved. As will be appreciated, conventional MMW and IR systems operate differently and employ different components and materials. In fact, many of the design constraints applicable to the two types of systems are mutually exclusive.

By way of illustration, sensors responsive to radiation in the MMW portion of the spectrum typically will not respond to IR radiation and sensors responsive to IR radiation typically will not respond to MMW radiation. As a result, separate detectors are required for the two portions of the spectrum. The detectors must, however, be coaxially aligned if their outputs are to be correlated. The mechanical integration necessary to achieve coaxial alignment introduces significant complications and interferences into the design.

One example of a prior art, dual-mode, MMW/IR antenna is provided in U.S. Pat. No. 4,636,797 (Saffold et al.). The Saffold et al. antenna includes a Cassegrain optics section that coaxially collects incident MMW and IR radiation. More particularly, radiation impinging upon a primary reflector of the optics section is reflected to a secondary reflector, where it is again reflected to an energy-collecting radome. The radome passes both MMW and IR radiation to a waveguide assembly that is coupled to the optics section.

A dichroic beam splitter is included in the waveguide assembly to separate the MMW and IR beams for subsequent processing. Specifically, the IR beam is reflected 90 degrees by the beam splitter before being redirected by another reflector to lenses and an IR processing section. The MMW beam, on the other hand, is transmitted without interruption by the beam splitter to a lens and a MMW quasi-optic processing section.

While a dual-mode antenna constructed in this manner does work, it has several shortcomings. First, the transmission of both beams through the radome, along with the transmission of the MMW beam and reflection of the IR beam at the dichroic splitter, may introduce significant losses into the system. Although not addressed in the patent, these losses are further exacerbated by the requiste addition of an external radome to the antenna for most applications. Second, the separation of the two beams and their eventual transmission along individual paths requires a relatively complex mechanical design.

Another example of a prior art, dual-mode, MMW/IR antenna is provided in U.S. Pat. No. 4,652,885 (Saffold et al.). This antenna, like that described in the '797 patent, employs a Cassegrain optics section to collect incident MMW and IR radiation. Upon reaching the waveguide, the MMW radiation is focused by a lens into the MMW quasi-optic processing circuit. The IR radiation, on the other hand, appears to be processed in one of several different ways.

For example, in the arrangement shown in FIG. 1 of the patent, a plurality of IR optical fibers are attached to the back of the MMW focus lens and conduct at least some of the IR beam to an IR processing section. Although the ends of the IR optical fibers do not appear to coincide with a focal point of the IR beam, the Cassegrain optics would not really provide MMW and IR beams in parallel as shown in FIG. 1. In another arrangement, shown in FIG. 3 of the '885 patent, the ends of the IR optical fibers are positioned behind the MMW focus lens, at the focal point of the IR beam and forward of the focal point of the MMW beam.

A dual-mode system constructed in the manner taught by the '885 Saffold et al. patent has several disadvantages. In that regard, because the IR optical fibers are located behind the MMW focus lens, the lens must be able to transmit both the MMW and IR beams. While such lenses exist, they must include an impedance matching layer for both the IR and MMW radiation. Without this layer, the IR and MMW radiation will be reflected at the lens surfaces. Such reflections, inevitably introduce greater losses into the system.

Along with the shortcomings attributable to location of the IR optical fibers at the back of the MMW focus lens, the Saffold et al. systems have several additional disadvantages. For example, the inclusion of the internal radome at the end of the waveguide introduces losses but does not eliminate the need for an external radome covering the Cassegrain optics section. Thus, although two radomes are not shown in the Saffold et al. arrangements illustrated in the patents, they would, in practice, be employed, contributing to system losses.

Also, the Saffold et al. designs are intended for single-point detection. As will be appreciated, however, it is frequently desirable to detect images. Although multidimensional detection can be accomplished by manipulation of a single-point detector, the drive requirements for such a system would be rather complex and expensive.

In view of the preceding observations, it would be desirable to provide an antenna system that can be used in multiple modes, without exhibiting large losses, and that can be used for image detection.

SUMMARY OF THE INVENTION

In accordance with the invention, a coaxial antenna system is disclosed for receiving and processing electromagnetic radiation falling within first and second frequency ranges. The system includes an antenna having a main reflector, provided with an aperture, and a subreflector. The main reflector of the antenna receives electromagnetic radiation and reflects it to the subreflector. The subreflector, in turn, reflects electromagnetic radiation from the main reflector. Electromagnetic radiation in the first frequency range reflected from the subreflector is relatively focused at a first focal plane defined relative to the antenna and is less focused at the first focal plane when in the second frequency range. The antenna system includes a support structure for supporting the subreflector relative to the main reflector.

An interface section is supported by the support structure and has an incident surface at least partially positioned in the first focal plane. The interface section redirects electromagnetic radiation reflected by the subreflector in the second frequency range. A first receiving section is coupled to the interface section and has an incident surface aligned with the incident surface of the interface section. The first receiving section is for receiving electromagnetic radiation in the first frequency range.

In accordance with one aspect of the invention, the interface section includes a lens for focusing electromagnetic radiation in the second frequency range at a second focal plane. The first receiving section includes an optical fiber, coupled to and extending through the lens. The optical fiber has an incident end and an emergent end, with the incident end being positioned in the first focal plane and aligned with the incident surface of the lens. The optical fiber conducts electromagnetic radiation in the first frequency range. Alternatively, the first receiving section may include a detector for detecting electromagnetic radiation in the first frequency range. The detector has an incident surface positioned in the first focal plane and aligned with the incident surface of the lens.

In accordance with another aspect of the invention, the interface section includes a mirror for reflecting electromagnetic radiation in the second frequency range. The system also includes a lens for focusing electromagnetic radiation reflected by the mirror in the second frequency range at a second focal plane. The first receiving section may include at least one optical fiber, coupled to and extending through the mirror. The optical fiber has an incident end and an emergent end, with the incident end being positioned in the first focal plane and aligned with the incident surface of the mirror. The optical fiber is for conducting electromagnetic radiation in the first frequency range.

In accordance with a further aspect of the invention, a method of coaxially receiving electromagnetic radiation at first and second frequency ranges is disclosed. The method includes the step of collecting electromagnetic radiation at the first and second frequency ranges. Electromagnetic radiation at the first frequency range is focused at a first focal plane. Electromagnetic radiation at the second frequency range is transmitted to the first focal plane. Electromagnetic radiation at the second frequency range is redirected from the first focal plane, without substantially influencing the electromagnetic radiation at the first frequency range. The electromagnetic radiation at the first frequency range focused at the first focal plane, and the redirected electromagnetic radiation at the second frequency range, is then received.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a schematic diagram of another embodiment of the antenna system of FIG. 1;

DETAILED DESCRIPTION OF THE PREFERRED EMBODIMENT

Figure 1:
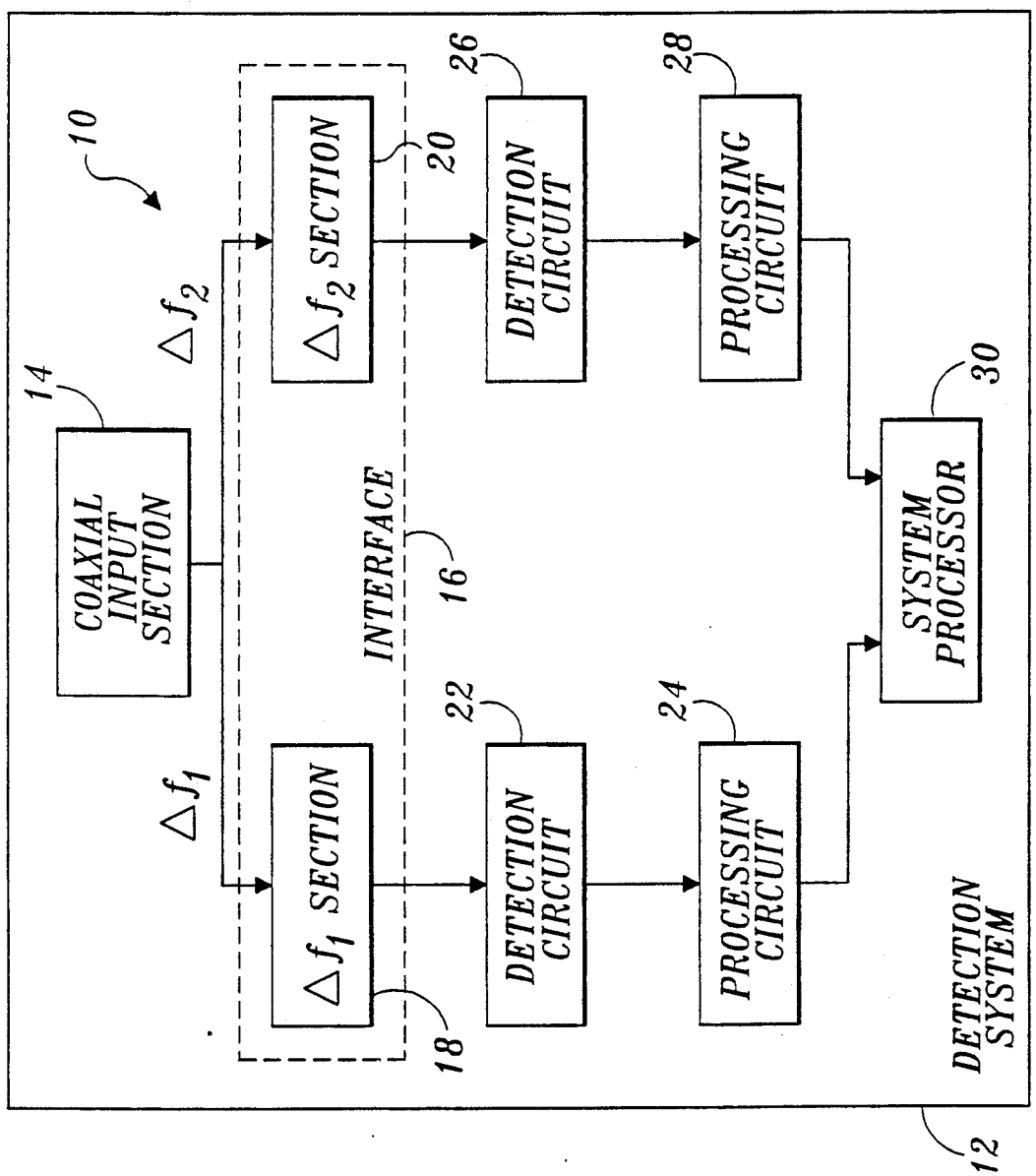
FIG. 1 is a block diagram of a basic dual-mode antenna system constructed in accordance with the invention.

Referring now to FIG. 1, a multiple-mode antenna system 10 is shown for use in, for example, a detection system 12. As will be described in greater detail below, the antenna system 10 receives electromagnetic radiation originating or reflected from objects within the antenna system's field of view over more than one frequency range. The detection system 12 then processes the received radiation to accurately detect, analyze, and track the objects.

With a multiple-mode antenna system 10 employed, any shortcomings attributable to operation of the detection system 12 over one portion of the electromagnetic spectrum may be compensated for by operation of system 12 over other portions of the spectrum. As will be described in greater detail below, the antenna system 10 is simply constructed, allows multiple-mode operation to be achieved with relatively low losses, and can be easily used for imaging.

The antenna system 10 includes a coaxial input section 14 that is coupled to the remainder of the detection system 12 by an interface section 16. The input section 14 coaxially provides electromagnetic radiation to the interface section 16 over, for example, two frequency ranges $\Delta f_1$ and $\Delta f_2$ at two different beamwidths. The interface section 16 includes separate sections 18 and 20 that process radiation at the two frequency ranges $\Delta f_1$ and $\Delta f_2$. As will be described in greater detail below, the two sections 18 and 20 cooperatively take advantage of the different beamwidths of the two frequency ranges $\Delta f_1$ and $\Delta f_2$ to allow the radiation to be processed with a minimum of loss.

As shown in FIG. 1, a detection circuit 22 receives radiation at the frequency range $\Delta f_1$ from interface section 18 and converts it to an electrical output. The electrical output of the detection circuit 22 is, in turn, applied to a processing circuit 24. The processing circuit 24 preferably conditions the output of the detection circuit 22 prior to further analysis by the detection system 12.

Similarly, a detection circuit 26 receives electromagnetic radiation at the frequency range $\Delta f_2$ from interface section 20 and converts it to an electrical output. The electrical output of the detection circuit 26 is, in turn, applied to a processing circuit 28. The processing circuit 28 preferably conditions the output of the detection circuit 26 prior to further analysis by the detection system 12.

The conditioned outputs of processing circuits 24 and 28 contain information regarding objects within the field of view of antenna system 10. These conditioned outputs are applied to a system processor 30, included in the detection system 12, which analyzes the outputs in accordance with programmed instructions to detect, analyze, and track the objects. In that regard, the system processor 30 is programmed to take advantage of the different performance characteristics attributable to operation of the antenna system 10 over the two frequency ranges $\Delta f_1$ and $\Delta f_2$.

Figure 2:
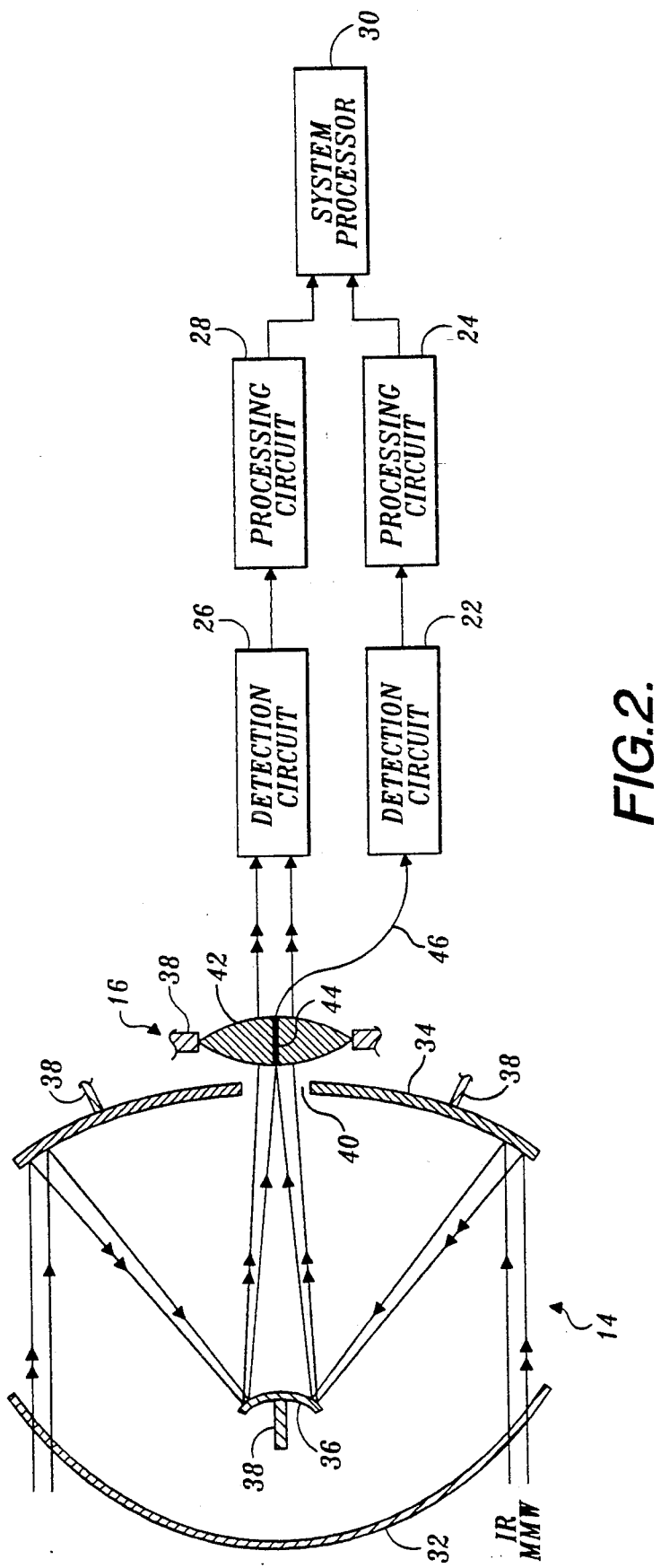
FIG. 2 is a more detailed schematic diagram of one embodiment of the antenna system of FIG. 1, constructed for use in single-point detection.

Discussing now one embodiment of the antenna system 10 in greater detail, reference is had to FIG. 2. In this arrangement, the antenna system 10 is constructed for operation in a "dual mode." More particularly, the antenna system 10 is designed to receive and process electromagnetic radiation over frequency ranges $\Delta f_1$ and $\Delta f_2$ corresponding to the infrared (IR) and millimeter wavelength (MMW) ranges, respectively.

As shown in the largely schematic illustration of FIG. 2, the coaxial input section 14 includes an external radome 32, main reflector 34, secondary reflector 36, and support structure 38. These components cooperatively collect electromagnetic radiation over the IR and MMW frequency ranges and coaxially provide the radiation to the interface section 16.

The external radome 32 covers the antenna system 10 and gives it the aerodynamic form required for use in aerospace applications. In that regard, the external radome 32 is of conventional design. The radome is sufficiently large to cover the main reflector 34 and secondary reflector 36, without interfering with the rotation of these components in azimuth or elevation.

Radome 32 is preferably made of a lightweight, high-strength material. In addition, the material selected for use in radome 32 should exhibit relatively low transmission losses over the applicable IR and MMW frequency ranges. In the preferred arrangement, the radome 32 is made of a material such as magnesium difluoride ($MgF_2$) or zinc sulfide (ZnS)

The main reflector 34 is nominally a paraboloidal reflector whose shape may be specifically tailored to limit gain variations and losses. Reflector 34 preferably includes a substrate or base made of a lightweight material, such as a carbon fiber composite, and is roughly one centimeter thick. A 40 micron-thick layer of reflective material, such as gold, is attached to the substrate to give reflector 34 the desired reflection characteristics over the IR and MMW frequency ranges. The diameter of reflector 34 is preferably on the order of 10 to 30 centimeters.

The main reflector 34 also includes an aperture 40, positioned at the "center" of reflector 34. The aperture 40 is roughly four centimeters in diameter and defines a pathway through which electromagnetic radiation collected by reflectors 34 and 36 leaves the input section 14. The main reflector 34 is supported by the support and drive structure 38.

The subreflector 36 is nominally a hyperbolic reflector. Like the main reflector 34, subreflector 36 preferably includes a substrate or base made of a lightweight material, such as a carbon fiber composite, that is roughly 0.2 centimeters thick. A 40 micron-thick layer of reflective material, such as gold, is attached to the substrate to ensure that subreflector 36 efficiently reflects electromagnetic radiation over both the IR and MMW frequency ranges. The diameter of the subreflector 36 is roughly 3 to 8 centimeters.

The subreflector 36 is fixedly supported relative to the main reflector 34 by the support and drive structure 38. More particularly, the foci of the main reflector 34 and subreflector 36 are separated by a distance of roughly 6 to 8 centimeters.

Reviewing collectively the operation of the various components of the input section 14, as shown in FIG. 2, IR and MMW electromagnetic radiation first pass through radome 32. The radiation is then collected by the main reflector 34 and reflected to the subreflector 36. The subreflector 36, in turn, reflects the IR and MMW radiation to the aperture 40 of the main reflector 34.

The operation of the main reflector 34 and subreflector 36 in this manner is in accordance with conventional Cassegrain optics. As will be appreciated from FIG. 2, the IR radiation is focused to a relatively narrow beamwidth by the input section 14. In that regard, the IR radiation is substantially focused to a point in a first focal plane. This first focal plane is located on the convex side of the main reflector 34 and spaced roughly 2 to 6 centimeters from the focus of the main reflector 34.

In contrast, the main reflector 34 and subreflector 36 do not precisely focus the MMW radiation. More particularly, the MMW beam is diffraction-limited and, as a result, focuses only to a relatively wide beam waist near the first focal plane. Unless otherwise refocused, the MMW beam will then diverge as it continues to propagate beyond the first focal plane. As previously noted, the interface section 16 relies upon the relatively large difference between the diameters of the focused energy in the IR and MMW beams to efficiently separate the two beams.

Before discussing the interface section 16 in greater detail, one final component of the input section 14 will be reviewed. In that regard, the support and drive structure 38 is not shown in detail in FIG. 2. As will be appreciated, however, it is of conventional design and is constructed to mechanically support the main reflector 34 and subreflector 36 in the desired relative alignment and rotate them in azimuth and elevation, without interfering in the transmission path therebetween. Structure 38 may further support other components of the detector system 12 as desired.

The support and drive structure 38 also includes the drive and control components required to achieve the desired adjustments in the azimuth and elevation of the main reflector 34 and subreflector 36. In that regard, the support and drive structure 38 may be responsive to manual operator inputs applied to the system processor 30. In addition, the system processor 30 may be programmed to initiate certain attitudinal adjustments in response to the IR and MMW outputs of processing circuits 24 and 28.

Addressing now the interface section 16 of the antenna system 10 in greater detail, section 16 relies in part upon the beamwidth differences of the MMW and IR beams to separate the two beams with a relatively small amount of beam attenuation or loss. As shown in FIG. 1, the interface section 16 is depicted in block form as including separate sections 18 and 20 associated with the IR and MMW beams to be processed.

The relationship between the two interface sections 18 and 20 is more clearly illustrated in FIG. 2. The MMW interface section 20 includes a Gaussian optic device that quasi-optically couples the input section 14 to the remainder of the antenna system 10. Interface section 20 redirects or transmits the diffraction-limited, wide-spot MMW beam to the detection circuit 26 as a Gaussian beam.

In the arrangement shown in FIG. 2, the MMW interface section 20 is a double convex lens 42 having a focal length of, for example, 4 to 8 centimeters. Lens 42 is preferably made of a plastic, such as cross-linked polystyrene, that exhibits very low losses with respect to transmissions in the MMW frequency range. The lens 42 includes a convex incident surface, the center of which is supported in the first focal plane with the aid of support structure 38, and a convex emergent surface.

The lens 42 also has a fiber passage 44 drilled into it. Passage 44 extends axially through lens 42, from the incident surface to the emergent surface. In the preferred arrangement, the passage 44 is slightly more than 0.1 millimeter in diameter and may taper slightly from the incident surface to the emergent surface.

As will be appreciated, MMW radiation impinging upon the incident surface of lens 42 is refocused by lens 42. Thus, the MMW beam emerging from lens 42 does not diverge, as would otherwise occur. With proper selection of the lens material, this refocusing is accomplished without introducing significant losses into the MMW beam path.

Turning to the IR interface section 18, section 18 couples the focused IR beam from the input section 14 to detection circuit 22. In that regard, in the arrangement shown in FIG. 2, section 18 is formed by an optical fiber 46. The optical fiber 46 is preferably made of a clad material, such as zirconium fluoride (ZrF) having low losses with respect to IR transmissions. The fiber 46 has an incident end and an emergent end and is roughly 0.1 millimeters thick and 50 centimeters long.

Fiber 46 is attached to the lens 42 with the aid of an adhesive, such as epoxy. In that regard, the incident end of fiber 46 is aligned with the incident surface of lens 42, ensuring that radiation received from the subreflector 36 falls on a substantially smooth and continuous surface. Given the position of the passage 44 in lens 42 and the position of the lens 42 relative to the main reflector 34, the optical fiber 46 is positioned to directly receive the focused IR beam.

Because the incident end of the optical fiber 46 is located at the focal point of the IR beam and receives the IR beam without requiring that beam to traverse other components of interface 16, the separation of the IR beam from the MMW beam is accomplished with extremely low losses. These losses are further controlled by the proper preparation of the incident end of fiber 46, for example, by polishing. Further, any coating on the fiber 46, as well as the adhesive used to bond fiber 46 and lens 42, may be selected to minimize losses experienced in the transmission of the IR beam.

Although the optical fiber 46 passes through the MMW beam path defined by lens 42, it has only a limited disruptive influence thereon. In that regard, the optical fiber 46 is aligned with the MMW beam and its cross-sectional area represents only a small fraction of the cross-sectional area of the MMW beam. Further, the adhesive employed to join the fiber 46 and lens 42 is selected to form an interface that is not disruptive of the MMW beam transmissions.

Figure 6:
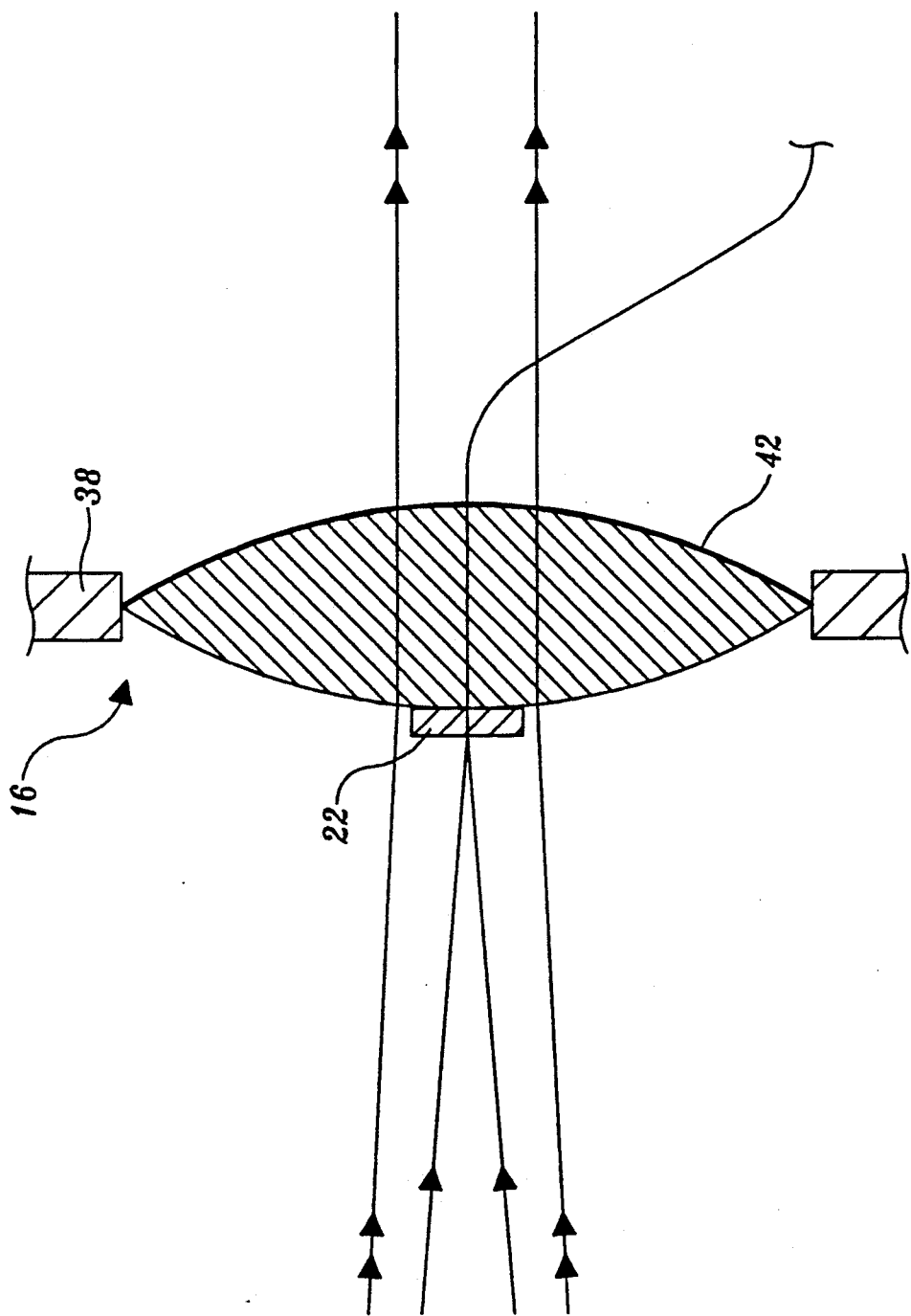
FIG. 6 is a partial pictorial view of another modification to the antenna system of FIG. 2.

In the embodiment shown in FIG. 2, the optical fiber 46 is employed to nondisruptively convey the focused IR beam through the MMW path to a remote detection circuit 22. As shown in FIG. 6, a sufficiently small IR detection circuit 22 could be positioned on the incident surface of lens 42 to collect the IR beam and directly convert it to an electrical signal, dispensing with the need for the optical fiber 46. The use of an optical fiber 46 is preferred, however, because it will not mechanically interfere with the main reflector 34, like an IR detector might, and will not significantly interfere with the optical MMW beam path.

Having discussed the interface section 16 in some detail, the remaining components of the detection system 12 will now be reviewed. As previously noted, the quasi-optical output of the lens 42 is provided to the MMW detection circuit 26. The detection circuit 26 includes a detector or detectors that respond to the output of lens 42 by producing an electrical output representative of the MMW radiation collected by the main reflector 34. In that regard, a MMW diode mixer is a suitable detector for inclusion in the detection circuit 26. As will be appreciated, the alignment of the detection circuit 26 relative to the lens 42 must be maintained by the support structure 38 as the main reflector 34 and subreflector 36 are swept in azimuth and elevation.

The electrical output of the detection circuit 26 is then forwarded to a processing circuit 28 where it is appropriately conditioned for use by the system processor 30. In that regard, the processing circuit 28 may amplify the output of the detection circuit 26 for further processing. Further, when a digital system processor 30 is employed, the processing circuit 28 will typically be called upon to perform the necessary analog-to-digital conversion.

The output of optical fiber 46 is, similarly, applied to the IR detection circuit 22. The detection circuit 22 includes a detector or detectors that convert the IR output of fiber 46 into an electrical signal that is representative of the IR radiation received by the main reflector 34. In that regard, a suitable detector is of the mercury cadmium tellurium (HgCdTe) or indium antimony (InSb) type.

The electrical output of the detection circuit 22 is, in turn, applied to processing circuit 24, where it is appropriately conditioned for use by the system processor 30. Like the MMW processing circuit 26, the IR processing circuit 24 typically is called upon to amplify the analog output of the detection circuit and convert it into digital form.

Finally, the system processor 30 receives the outputs of the IR and MMW processing circuits 24 and 28 to, for example, detect, analyze, and track a moving object within the field of view of antenna system 10. Although shown as a single block in FIGS. 1 and 2, as will be appreciated, the processor 30 is conventionally part of a complex system including input and output devices, data and program storage devices, and interfaces, along with a central processing unit. Given the conventional nature, organization, and operation of such individual components, they are not treated in any detail in this discussion.

Collectively, the operation of the system processor 30 is as follows. The system processor 30 evaluates the output of the MMW processing circuit 28 to locate and track objects in the antenna system's field of view, in accordance with preprogrammed instructions. As previously noted, the propagation characteristics of MMW radiation are such that the output of the MMW processing circuit 28 is useful in detecting objects over long distances and wide areas with little interference from environmental elements. Because of the relatively large width of the MMW beam, however, the ability of the system processor 30 to resolve objects based upon the MMW output of processing circuit 28 is limited.

Fortunately, with the coaxial dual-mode antenna system 10 employed, the system processor 30 is able to simultaneously evaluate the output of the IR processing circuit 24 to locate and track objects in accordance with preprogrammed instructions. The narrow beamwidth of the IR radiation allows the IR output of processing circuit 24 to be used to resolve objects with greater accuracy.

Thus, the system processor 30 is programmed to evaluate the outputs of both processing circuits 24 and 28. Depending upon the desired operation, the processor 30 may be instructed to alternatively use the outputs in its analysis of an object's position, based upon the relative advantages of operation at the two frequency ranges. As another option, the processor 30 may be instructed to simultaneously evaluate the two outputs and assign some relative weighting to their use in the final determination of an object's position. As will be appreciated, the design of the interface section 16 allows the advantages of this multiple-mode operation to be achieved with low transmission losses.

The interface 16 shown in FIG. 2 works well when the detection system 12 is used for single-point detection. When, however, a two-dimensional image is to be obtained, this arrangement has certain limitations. More particularly, the main reflector 34 and subreflector 36 must be widely scanned to generate two-dimensional images, necessitating more complex and responsive operation of the support and drive structure 38.

Figure 3:
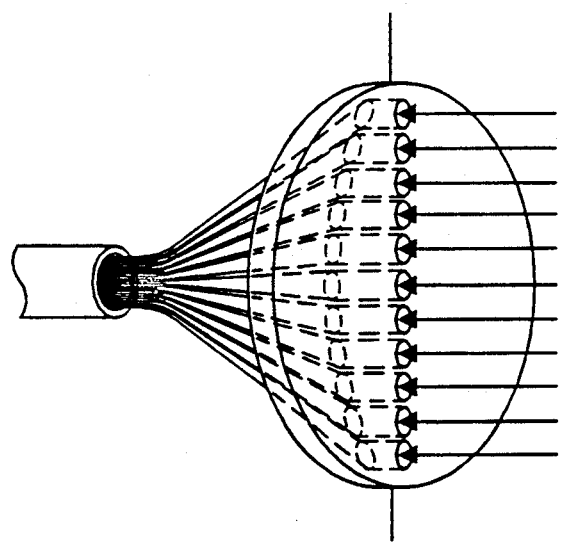
FIG. 3 is a partial pictorial view of a modification to the antenna system of FIG. 2 that can be made when the antenna system is to be used in image detection.

One way in which the interface 16 shown in FIG. 2 could be modified for use in image detection would be to include a vertically oriented line array of optical fibers or detectors at the first focal plane, as shown in FIG. 3. As a result, a line of data could be evaluated for a single position of the main reflector 34. Such a modification would require the use of a plano-convex lens 42. As shown in FIG. 3, the planar side of such a lens provides a flat focal plane surface at which the incident ends of a line array of vertically oriented fibers can be positioned in the same manner described above in connection with FIG. 2.

Before reviewing another arrangement useful for two-dimensional image detection, an alternative single-point detection system 12 shown in FIG. 4 will be considered. The system 12 of FIG. 4 is readily modified for use in image detection. The arrangement shown in FIG. 4 parallels that shown in FIG. 2 and like components are identified with like reference numbers.

The difference between the systems 12 shown in FIGS. 2 and 4 is in the construction of the interface 16. In that regard, the MMW section 20 of the interface 16 shown in FIG. 4 includes a mirror 48, provided with a fiber passage 50, in place of the lens 42 of FIG. 2. Section 20 also includes a lens 52.

Reviewing these components in greater detail, mirror 48 is a flat mirror. The mirror 48 exhibits negligible loss at the MMW frequencies to be reflected. The mirror 48 is supported by support structure 38 with its center positioned at the IR focal point of the coaxial input section 14. The mirror 48 is further oriented at a 45-degree angle relative to the axis of the input section 14 to bend the MMW beam parallel to the azimuth axis. As a result, the mirror 48 has a "centerline" that is normal to the axis of the input section 14 and to the reflected path of the MMW radiation. This relative alignment of the mirror 48 to the main reflector 34 is maintained by the support structure 38 as the main reflector 34 and subreflector 36 are rotated in azimuth and elevation.

As noted, the mirror 48 includes a single optical fiber passage 50 at its center point. The passage 50 is designed to receive the IR optical fiber 46, which is attached thereto in the manner previously discussed in connection with the lens 42. The incident end of fiber 46 is maintained at the IR focal point, allowing the fiber 46 to collect substantially all of the IR radiation without attenuation by components in the MMW path of interface 16.

The MMW beam reflected by the mirror 48 is transmitted to the lens 52. Lens 52 has substantially the same design and purpose as the lens 42 of FIG. 2. The primary exception, however, is that the lens 52 of FIG. 4 does not include a passage for an optical fiber. Lens 52 refocuses the MMW beam to limit its divergence and transmits it to the detection circuit 26. Once the IR radiation is received at detection circuit 22 and the MMW radiation is received at detection circuit 26, further processing is accomplished in the manner described above.

Figure 5:
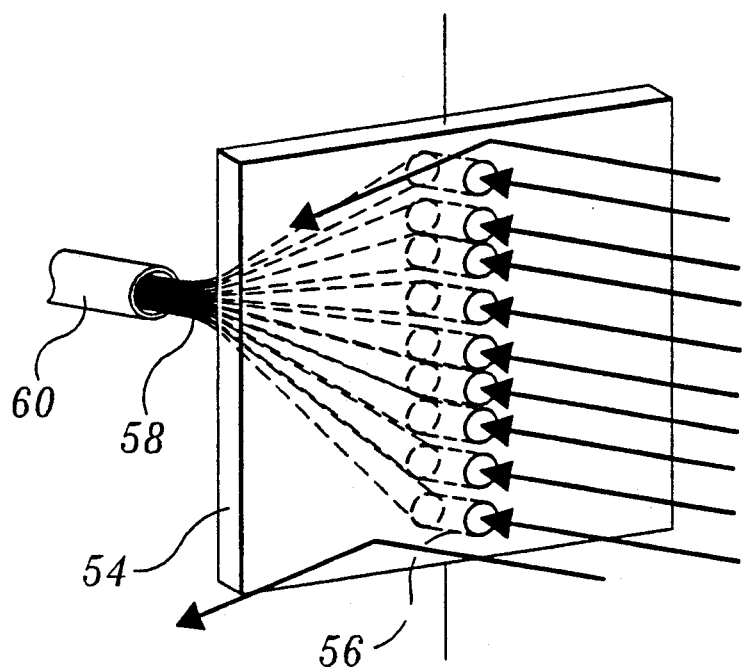
FIG. 5 is a partial pictorial view of a modification to the antenna system of FIG. 4 to be made when the antenna system is to be used in image detection.

Addressing now the manner in which the arrangement of FIG. 4 is modified for use in image detection, reference is had to FIG. 5. As shown, the centerline of mirror 54, positioned in the same manner as mirror 48, is provided with a plurality of fiber passages 56 arrayed in a flat line. The incident ends of a plurality of optical fibers 58 are mounted in the passages in the manner previously described in connection with FIGS. 2 and 4. As will be appreciated, a desired line array is thus provided at a constant depth relative to the first focal plane, allowing the data collection required to perform imaging to be achieved by rotation of the main reflector 34 and subreflector 36 in a single direction.

The image detection arrangement shown in FIG. 5 is advantageously simple in construction. Further, while the lens employed in the arrangement shown in FIG. 3 may introduce MMW reflective losses, the mirror of FIG. 5 redirects the MMW radiation with negligible loss.

Regardless of the construction of the interface 16, when the system 12 is designed for use in image detection the processor 30 must be programmed in accordance with conventional techniques to appropriately interpret the outputs of circuits 24 and 28. In addition, when the arrangement of FIG. 5 is employed as part of an image detection system, the detection circuits 22 and 26 and processing circuits 24 and 28 must be modified to handle the multiple-channel outputs received from the various fibers 58.

As will be appreciated, although the disclosed invention has primary applicability in a dual-mode configuration, it could also be used in other multiple-mode configurations. In that regard, repetitive interface sections could be developed, employing a plurality of optical fiber and lens pairs so sequentially separate radiation at different frequency ranges. As will be appreciated, however, the inclusion of additional stages would necessarily increase transmission losses experienced by the later stages.

Those skilled in the art will recognize that the embodiments of the invention disclosed herein are exemplary in nature and that various changes can be made therein without departing from the scope and the spirit of the invention. In this regard, and as was previously mentioned, the invention is readily embodied with a variety of Gaussian optic devices in place of the MMW focus lens. Further, it will be recognized that the use of optical fibers can be avoided by direct detection of the IR beam, subject to any losses introduced by such a modification. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A coaxial antenna system for processing electromagnetic radiation falling within first and second frequency ranges, said antenna system comprising:
   an antenna including a main reflector, provided with an aperture, and a subreflector, said main reflector of said antenna being for reflecting electromagnetic radiation to said subreflector, said subreflector of said antenna being for reflecting the electromagnetic radiation from said main reflector, the electromagnetic radiation reflected from said subreflector being relatively focused at a first focal plane defined relative to said antenna when in the first frequency range and being less focused at the first focal plane when in the second frequency range;
   first interface means, having a front surface and a rear surface, said front surface being disposed nearer said subreflector than said rear surface and being at least partially positioned in the first focal plane, for redirecting the electromagnetic radiation reflected by said subreflector in the second frequency range; and
   second interface means, coupled to said first interface means and having an incident surface disposed at said front surface of said first interface means, for receiving electromagnetic radiation in the first frequency range.

2. The antenna system of claim 1, wherein said first interface means comprises a lens for focusing the electromagnetic radiation in the second frequency range at a second focal plane.

3. The antenna system of claim 2, wherein said second interface means comprises an optical fiber, coupled to and extending through said lens, said optical fiber having an incident end and an emergent end, said incident end of said optical fiber being positioned in the first focal plane and aligned with said front surface of said lens, said optical fiber being for conducting electromagnetic radiation in the first frequency range.

4. The antenna system of claim 3, wherein the first frequency range is the infrared range and wherein the second frequency range is the millimeter wavelength range, said system further comprising:
   infrared processing means, coupled to said emergent end of said optical fiber, for processing electromagnetic radiation in the infrared range, conducted by said optical fiber, to produce an infrared output representative of the electromagnetic radiation in the infrared range; and
   millimeter wavelength processing means for processing electromagnetic radiation in the millimeter wavelength range, focused by said lens, to produce a millimeter wavelength range output representative of the electromagnetic radiation in the millimeter wavelength range.

5. The antenna system of claim 4, wherein said infrared processing means comprises at least one infrared detector and wherein said millimeter wavelength processing means comprises at least one millimeter wavelength detector.

6. The antenna system of claim 2, wherein said second interface means comprises detection means for detecting electromagnetic radiation in the first frequency range, said detection means including an incident surface positioned in the first focal plane and aligned with said front surface of said lens.

7. The antenna system of claim 1, wherein said first interface means comprises a mirror for reflecting the electromagnetic radiation in the second frequency range.

8. The antenna system of claim 7, further comprising a lens for focusing the electromagnetic radiation reflected by said mirror in the second frequency range at a second focal plane.

9. The antenna system of claim 8, wherein said means comprises at least one optical fiber, coupled to and said mirror, said optical fiber having an incident end and an incident end of said optical fiber being positioned in the first focal with said first surface of said mirror, said optical fiber being electromagnetic radiation in the first frequency range.

10. The antenna system of claim 9, wherein the first the infrared range and wherein the second frequency range is wavelength range, said system further comprising:
   infrared processing means, coupled to said emergent end of fiber, for processing electromagnetic radiation in the infrared range, conducted by fiber, to produce an infrared output representative of the electromagnetic radiation in the and
   millimeter wavelength processing means, for processing electromagnetic radiation in the millimeter focused by said lens, to produce a millimeter wavelength range output electromagnetic radiation in the millimeter wavelength range.

11. The antenna system of claim 10, wherein said means comprises detection means, coupled to, and receiving from said emergent end of said optical fiber, for detecting electromagnetic frequency range.

12. The antenna system of claim 1, wherein said electromagnetic radiation received from said main reflector optical path extending through said aperture of said main reflector, wherein said mechanically unobstructed.

13. The antenna system of claim 12, wherein in the first frequency range impinges upon only said after leaving said main reflector and before reaching said means.

14. The antenna system of claim 12, further comprising means for receiving electromagnetic radiation in the second redirected by said first interface means, the electromagnetic radiation received in the range impinging upon only said subreflector and said first interface means, after reflector and before reaching said receiving means.

15. A coaxial antenna system for processing falling within infrared and millimeter wavelength frequency system comprising:
- an antenna including a nominally parabolic main reflector hyperbolic subreflector, said main reflector of said antenna being for electromagnetic radiation to said subreflector, said subreflector of said antenna being for electromagnetic radiation from said main reflector, the electromagnetic radiation reflected subreflector being relatively focused at a first focal plane defined relative to said infrared frequency range and being less focused at the first focal plane when in the frequency range;
- a lens, having an incident surface and an emergent surface, said incident surface being disposed nearer said emergent surface and said incident surface being at least partially positioned in plane, said lens being for focusing the electromagnetic radiation in the millimeter range at a second focal plane;
- infrared receiving means, coupled to said lens and having surface disposed at said incident surface of said lens, for receiving electromagnetic infrared frequency range reflected by said subreflector; and
- millimeter receiving means, positioned at least partially focal plane, for receiving electromagnetic radiation in the millimeter wavelength range lens.

16. A coaxial antenna system for processing falling within infrared and millimeter wavelength ranges, said comprising;
- an antenna including a substantially parabolic main substantially hyperbolic subreflector, said main reflector of said antenna being for electromagnetic radiation to said subreflector, said subreflector of said antenna being for electromagnetic radiation from said main reflector, the electromagnetic radiation reflected being relatively focused at a first focal plane defined relative to said antenna when frequency range and being less focused at the first focal plane when in the millimeter frequency range;
- a mirror, having a front surface and a rear surface, said generally facing toward the subreflector, and being at least positioned in the first focal plane, said mirror being for reflecting electromagnetic radiation in wavelength frequency range;
- a lens for focusing the electromagnetic radiation in the millimeter wavelength range mirror at a second focal plane;
- infrared receiving means, coupled to said mirror and surface disposed at the front surface of said mirror, for receiving infrared frequency range reflected by said subreflector; and
- millimeter wavelength receiving means, positioned at least the second focal plane, for receiving electromagnetic radiation in the millimeter focused by said lens.

17. The antenna system of claim 16, wherein said infrared disposed for receiving electromagnetic radiation in the at a single focal point of said reflector.

18. The antenna system of claim 16, wherein said means is for receiving electromagnetic radiation in the range at a line of points.

19. A method of coaxially receiving electromagnetic and second frequency ranges comprising the steps of:
- focusing electromagnetic radiation with a reflector at the range at a first focal plane that is at least partially coincident with a front redirector, said redirector having front and near surfaces, the front surface generally facing reflector;
- focusing electromagnetic radiation with the reflector at frequency range to the first focal plane, the electromagnetic radiation at the second a beam waist in the first focal plane that is relatively wide compared to that of electromagnetic radiation at the first frequency range;
- redirecting electromagnetic radiation at the second the first focal plane with the redirector, without substantially influencing the radiation at the first frequency range;
- receiving the electromagnetic radiation at the first at the first focal plane upon a third surface, wherein the third surface is front surface; and
- receiving the redirected electromagnetic radiation at the range.

20. The method of claim 19, wherein the step of electromagnetic radiation at the second frequency range focusing substantially only the electromagnetic radiation at frequency range, received at the first focal plane, to a second focal electromagnetic radiation at the first frequency range having been received focusing of the electromagnetic radiation at the second frequency range.

21. The method of claim 19, wherein the step of electromagnetic radiation at the second frequency range steps of:
- reflecting substantially only the electromagnetic frequency range, received at the first focal plane, to a lens; and
- focusing the electromagnetic radiation at the second received by the lens at a second focal plane.

22. The method of claim 21, wherein the step of receiving redirected electromagnetic radiation at the second frequency the step of receiving radiation at a plurality of points aligned focal plane.

* * * * *

UNITED STATES PATENT AND TRADEMARK OFFICE
CERTIFICATE OF CORRECTION

PATENT NO. : 5,298,909                              Page 1 of 10
DATED : March 29, 1994
INVENTOR(S) : S. J. Peters et al.

It is certified that error appears in the above-indentified patent and that said Letters Patent is hereby corrected as shown below:

| COLUMN | LINE | |
|---|---|---|
| 12 (Claim 9 | Line 1) | after "said" insert --second interface-- |
| 12 (Claim 9 | Line 2) | after "and" insert --extending through-- |
| 12 (Claim 9 | Line 3) | after "an" (second occurrence) insert --emergent end, said-- |
| 12 (Claim 9 | Line 5) | after "focal" insert --plane and aligned-- |
| 12 (Claim 9 | Line 6) | after "being" insert --for conducting-- |
| 12 (Claim 10 | Line 1) | after "first" insert --frequency range is-- |
| 12 (Claim 10 | Line 3) | after "is" insert --the millimeter-- |
| 12 (Claim 10 | Line 6) | after "of" insert --said optical-- |
| 12 (Claim 10 | Line 7) | after "by" insert --said optical-- |

UNITED STATES PATENT AND TRADEMARK OFFICE
CERTIFICATE OF CORRECTION

PATENT NO. : 5,298,909
DATED : March 29, 1994
INVENTOR(S) : S. J. Peters et al.

It is certified that error appears in the above-indentified patent and that said Letters Patent is hereby corrected as shown below:

| COLUMN | LINE | |
|---|---|---|
| 12 (Claim 10 | 65 Line 9) | after "the" insert --infrared range;-- |
| 12 (Claim 10 | 67 Line 11) | after "millimeter" insert --wavelength range,-- |
| 13 (Claim 10 | 1 Line 13) | after "output" insert --representative of the-- |
| 13 (Claim 11 | 3 Line 1) | after "said" insert --second interface-- |
| 13 (Claim 11 | 4 & 5 Line 3) | after "re-ceiving" insert --electromagnetic radiation-- |
| 13 (Claim 11 | 6 Line 4) | after "electromagnetic" insert --radiation in the first-- |
| 13 (Claim 12 | 7 Line 1) | after "said" insert --subreflector reflects the-- |
| 13 (Claim 12 | 8 Line 2) | after "reflector" insert --generally along an-- |
| 13 (Claim 12 | 10 Line 4) | after "said" insert --optical path is-- |

UNITED STATES PATENT AND TRADEMARK OFFICE
CERTIFICATE OF CORRECTION

PATENT NO. : 5,298,909
DATED : March 29, 1994
INVENTOR(S) : S. J. Peters et al.

Page 3 of 10

It is certified that error appears in the above-indentified patent and that said Letters Patent is hereby corrected as shown below:

| COLUMN | LINE | |
|---|---|---|
| 13 (Claim 13 | 12 Line 1) | after "wherein" insert --electromagnetic radiation-- |
| 13 (Claim 13 | 13 Line 2) | after "said" insert --subreflector-- |
| 13 (Claim 13 | 14 Line 3) | after "said" insert --second interface-- |
| 13 (Claim 14 | 16 & 17 Line 2) | after "compris-ing" insert --receiving-- |
| 13 (Claim 14 | 18 Line 3) | after "second" insert --frequency range-- |
| 13 (Claim 14 | 19 Line 4) | after "the" insert --second frequency-- |
| 13 (Claim 14 | 21 Line 6) | after "after" insert --leaving said main-- |
| 13 (Claim 15 | 23 Line 1) | after "processing" insert --electromagnetic radiation-- |
| 13 (Claim 15 | 24 Line 2) | after "frequency" insert --ranges, said antenna-- |

UNITED STATES PATENT AND TRADEMARK OFFICE
CERTIFICATE OF CORRECTION

PATENT NO. : 5,298,909
DATED : March 29, 1994
INVENTOR(S) : S. J. Peters et al.

It is certified that error appears in the above-indentified patent and that said Letters Patent is hereby corrected as shown below:

| COLUMN | LINE | |
|---|---|---|
| 13 (Claim 15 | 27 Line 5) | after "reflector" insert --and a nominally-- |
| 13 (Claim 15 | 28 Line 6) | after "for" insert --reflecting-- |
| 13 (Claim 15 | 30 Line 8) | after "for" insert --reflecting the-- |
| 13 (Claim 15 | 32 Line 10) | after "reflected" insert --from said-- |
| 13 (Claim 15 | 33 Line 11) | after "said" insert --antenna when in the-- |
| 13 (Claim 15 | 35 Line 13) | after "the" insert --millimeter wavelength-- |
| 13 (Claim 15 | 38 Line 16) | after "said" (first occurrence) insert --subreflector than said-- |
| 13 (Claim 15 | 39 Line 17) | after "in" insert --the first focal-- |
| 13 (Claim 15 | 41 Line 19) | after "millimeter" insert --wavelength frequency-- |

UNITED STATES PATENT AND TRADEMARK OFFICE
CERTIFICATE OF CORRECTION

PATENT NO. : 5,298,909
DATED : March 29, 1994
INVENTOR(S) : S. J. Peters et al.

It is certified that error appears in the above-indentified patent and that said Letters Patent is hereby corrected as shown below:

| COLUMN | LINE | |
|---|---|---|
| 13 (Claim 15 | 43 Line 21) | after "having" insert --an incident-- |
| 13 (Claim 15 | 44 Line 22) | after "electromagnetic" insert --radiation in the-- |
| 13 (Claim 15 | 46 & 47 Line 25) | after "par-tially" insert --at the second focal-- |
| 13 (Claim 15 | 48 Line 26) | after "range" insert --focused by said-- |
| 13 (Claim 16 | 49 Line 1) | after "processing" insert --electromagnetic radiation-- |
| 13 (Claim 16 | 50 Line 2) | after "said" insert --antenna system-- |
| 13 (Claim 16 | 52 Line 4) | after "main" insert --reflector and a-- |
| 13 (Claim 16 | 54 Line 6) | after "for" insert --reflecting-- |
| 13 (Claim 16 | 56 Line 8) | after "for" insert --reflecting the-- |

UNITED STATES PATENT AND TRADEMARK OFFICE
CERTIFICATE OF CORRECTION

PATENT NO. : 5,298,909      Page 6 of 10
DATED : March 29, 1994
INVENTOR(S) : S. J. Peters et al.

It is certified that error appears in the above-indentified patent and that said Letters Patent is hereby corrected as shown below:

| COLUMN | LINE | |
|---|---|---|
| 13 (Claim 16 | 58 Line 10) | after "reflected" insert --from said reflector-- |
| 13 (Claim 16 | 59 Line 11) | after "when" insert --in the infrared-- |
| 13 (Claim 16 | 61 Line 13) | after "millimeter" insert --wavelength-- |
| 13 (Claim 16 | 64 Line 16) | after "said" insert --front surface-- |
| 14 (Claim 16 | 1 Line 17) | after "least" insert --partially-- |
| 14 (Claim 16 | 3 Line 19) | after "in" insert --the millimeter-- |
| 14 (Claim 16 | 5 Line 21) | after "range" insert --reflected by said-- |
| 14 (Claim 16 | 7 Line 23) | after "and" insert --having an incident-- |
| 14 (Claim 16 | 9 Line 25) | after "receiving" insert --electromagnetic radiation in the-- |

UNITED STATES PATENT AND TRADEMARK OFFICE
CERTIFICATE OF CORRECTION

PATENT NO. : 5,298,909
DATED : March 29, 1994
INVENTOR(S) : S. J. Peters et al.

It is certified that error appears in the above-indentified patent and that said Letters Patent is hereby corrected as shown below:

| COLUMN | LINE | |
|---|---|---|
| 14 (Claim 16 | 12 Line 28) | after "least" insert --partially in-- |
| 14 (Claim 16 | 13 Line 29) | after "millimeter" insert --wavelength range-- |
| 14 (Claim 17 | 16 Line 2) | after "infrared" insert --receiving means is-- |
| 14 (Claim 17 | 17 Line 3) | after "the" insert --infrared frequency range-- |
| 14 (Claim 18 | 18 Line 1) | after "said" insert --infrared receiving-- |
| 14 (Claim 18 | 19 Line 2) | after "the" insert --infrared frequency-- |
| 14 (Claim 19 | 21 Line 1) | after "electromagnetic" insert --radiation at first-- |
| 14 (Claim 19 | 24 Line 4) | after "the" insert --first frequency-- |
| 14 (Claim 19 | 25 Line 5) | after "front" insert --surface of a-- |

UNITED STATES PATENT AND TRADEMARK OFFICE
CERTIFICATE OF CORRECTION

PATENT NO. : 5,298,909
DATED : March 29, 1994
INVENTOR(S) : S. J. Peters et al.

Page 8 of 10

It is certified that error appears in the above-indentified patent and that said Letters Patent is hereby corrected as shown below:

| COLUMN | LINE | |
|---|---|---|
| 14 (Claim 19 | 26 Line 6) | "near" should read --rear-- |
| 14 (Claim 19 | 27 Line 7) | after "facing" insert --toward the-- |
| 14 (Claim 19 | 29 Line 9) | after "at" insert --the second-- |
| 14 (Claim 19 | 30 Line 10) | after "second" insert --frequency range having-- |
| 14 (Claim 19 | 32 Line 12) | after "of" insert --the-- |
| 14 (Claim 19 | 34 Line 14) | after "second" insert --frequency range from-- |
| 14 (Claim 19 | 36 Line 16) | after "the" (first occurrence) insert --electromagnetic-- |
| 14 (Claim 19 | 38 Line 18) | after "first" insert --frequency range focused-- |
| 14 (Claim 19 | 40 Line 20) | after "is" insert --disposed at said-- |

UNITED STATES PATENT AND TRADEMARK OFFICE
CERTIFICATE OF CORRECTION

PATENT NO. : 5,298,909
DATED : March 29, 1994
INVENTOR(S) : S. J. Peters et al.

It is certified that error appears in the above-indentified patent and that said Letters Patent is hereby corrected as shown below:

| COLUMN | LINE | |
|---|---|---|
| 14 (Claim 19 | 42 Line 22) | after "the" insert --second frequency-- |
| 14 (Claim 20 | 44 Line 1) | after "of" insert --redirecting-- |
| 14 (Claim 20 | 45 Line 2) | after "range" insert --comprises the step of-- |
| 14 (Claim 20 | 46 & 47 Line 4) | after "at" (first occurrence) insert --the second-- |
| 14 (Claim 20 | 47 Line 5) | after "focal" insert --plane, the-- |
| 14 (Claim 20 | 49 Line 6) | after "received" insert --prior to the-- |
| 14 (Claim 21 | 52 Line 1) | after "of" (second occurrence) insert --redirecting-- |
| 14 (Claim 21 | 53 Line 2) | after "range" insert --comprises the-- |
| 14 (Claim 21 | 55 Line 4) | after "electromagnetic" insert --radiation at the second-- |

UNITED STATES PATENT AND TRADEMARK OFFICE
CERTIFICATE OF CORRECTION

PATENT NO. : 5,298,909

DATED : March 29, 1994

INVENTOR(S) : S. J. Peters et al.

It is certified that error appears in the above-indentified patent and that said Letters Patent is hereby corrected as shown below:

| COLUMN | LINE | |
|---|---|---|
| 14 (Claim 21 | 58 Line 7) | after "second" insert --frequency range-- |
| 14 (Claim 22 | 60 & 61 Line 2) | after "re-ceiving" insert --the-- |
| 14 (Claim 22 | 62 Line 3) | after "frequency" insert --range comprises-- |
| 14 (Claim 22 | 63 Line 4) | after "aligned" insert --in the first-- |

Signed and Sealed this

Twenty-sixth Day of July, 1994

Attest:

BRUCE LEHMAN

Attesting Officer       Commissioner of Patents and Trademarks

UNITED STATES PATENT AND TRADEMARK OFFICE
CERTIFICATE OF CORRECTION

PATENT NO. : 5,298,909
DATED : March 29, 1994
INVENTOR(S) : S.J. Peters et al.

It is certified that error appears in the above-indentified patent and that said Letters Patent is hereby corrected as shown below:

| COLUMN | LINE | |
|---|---|---|
| 12<br>(Claim 7 | 45<br>Line 4) | after "range" insert --from a first surface of said mirror-- |

Signed and Sealed this

Twenty-fifth Day of October, 1994

Attest:

BRUCE LEHMAN

*Attesting Officer*    *Commissioner of Patents and Trademarks*